United States Patent
Bell

(10) Patent No.: US 8,351,754 B2
(45) Date of Patent: Jan. 8, 2013

(54) METHOD AND APPARATUS FOR AUTOMATIC STORAGE OF OPTICAL FIBER CABLE SLACK DURING AND AFTER CABLE DEPLOYMENT

(75) Inventor: George N. Bell, Stormville, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 310 days.

(21) Appl. No.: 12/649,405

(22) Filed: Dec. 30, 2009

(65) Prior Publication Data
US 2011/0158597 A1    Jun. 30, 2011

(51) Int. Cl.
    *G02B 6/00*    (2006.01)
    *B65H 75/00*    (2006.01)
(52) U.S. Cl. ........................................... 385/135
(58) Field of Classification Search .................. 385/135, 385/136, 147; 439/501, 683, 685, 686, 725, 439/640, 449
See application file for complete search history.

(56) References Cited

U.S. PATENT DOCUMENTS

| | | | | |
|---|---|---|---|---|
| 4,758,924 A | * | 7/1988 | Dillon et al. | 361/692 |
| RE34,955 E | * | 5/1995 | Anton et al. | 385/53 |
| 6,406,327 B1 | * | 6/2002 | Soon | 439/501 |
| 6,694,084 B1 | * | 2/2004 | Nakamura | 385/135 |
| 7,460,757 B2 | * | 12/2008 | Hoehne et al. | 385/135 |
| 7,609,933 B2 | * | 10/2009 | Dofher | 385/135 |

* cited by examiner

Primary Examiner — Akm Ullah

(57) ABSTRACT

A technique for storing cable slack in an automatic and safe manner, to allow a plug and play connectivity for fiber optic cable installation between floors in multi-floor high-rise apartment buildings. A tamper-proof storage box is located in a prescribed location for which its footprint is intended, such as a utility closet in a lobby or basement. The box contains a number of reels of cable (bundles of individual optical strands), each reel's contents designated for a different floor in the building. As pre-connectorized strands are pulled from a rotatable spindle mounted in the storage box to its intended floor, any cable excess (slack) remains automatically on the spindle in the storage box in an out-of-the-way location avoiding tampering and tripping. This allows off the shelf lengths of cable saving time and expense.

11 Claims, 4 Drawing Sheets

METHOD AND APPARATUS FOR AUTOMATIC STORAGE OF OPTICAL FIBER CABLE SLACK DURING AND AFTER CABLE DEPLOYMENT

BACKGROUND INFORMATION

Installation of fiber-optic transmission systems in multi-floor apartment and similar buildings can be challenging. For example, one issue is how to safely and sensibly store fiber optic cable that has been deployed throughout hallways of an apartment building while a telecommunications company waits for requests from individual residents of the building for delivery of that fiber-optic service into their individual apartments. This issue is addressed by the technique described in U.S. patent application Ser. No. 12/428,813 filed Apr. 23, 2009 titled "Hidden Drop Storage Device," assigned to the assignee of the instant application and incorporated herein by reference in its entirety.

Another challenge emerges during deployment of cable between the floors in such a building, the inter-floor cable deployment normally occurring before the above-noted hallway cable deployment. For example, a problem can arise from attempting to store excess length, or slack, of pre-connectorized optical fiber bundles. Initially, fiber optic cable is brought from a telecommunications company (telco) located remotely from the apartment building to an indoor fiber distribution hub (IFDH) which can be located in one of several areas of the building such as, e.g., the basement or lobby. Connections are then made from the IFDH to each floor in the building. But, each floor can be a different distance away from the IFDH. If cable lengths were precisely tailored for each floor of a building, there would be no cable slack after deployment to each floor, but this approach would be very costly and time consuming. Standardized lengths can avoid those high costs, but using standardized lengths of pre-connectorized cable to connect from the IFDH to each floor shall result in substantial cable slack. Cable slack would then need to be stored permanently and safely on each floor. But, containers for storage of that slack in plain sight in hallways attracts tampering or vandalism and/or can be an ingress/egress hazard for occupants of, and visitors to, the building. Thus, there is a need for automatic storage, during installation, of optical cable slack of pre-connectorized and standard-sized cables that can be used to connect between floors of a multi-floor apartment building in a plug and play manner, where such storage is automatically accomplished in safe and sensible pre-assigned areas within the building set aside for that purpose.

DETAILED DESCRIPTION OF PREFERRED EMBODIMENTS

Figure 1:
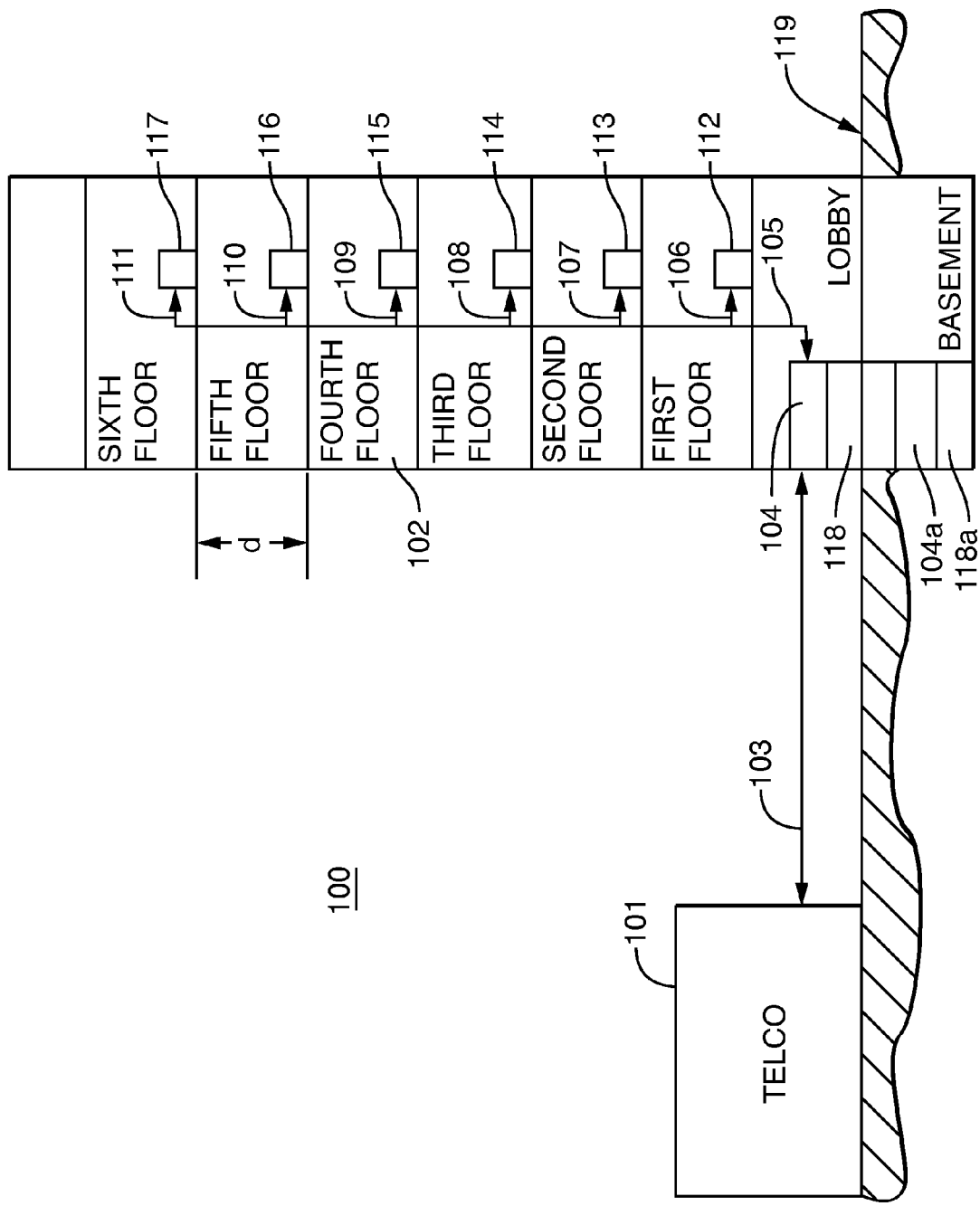
FIG. 1 is an exemplary schematic diagram depicting the relationship between a telecommunications company and a multi floored building wherein exemplary embodiments are particularly useful.

In this description, the same reference numeral in different Figs. refers to the same entity. Otherwise, reference numerals of each Fig. start with the same number as the number of that Fig. For example, FIG. 3 has numerals in the "300" category and FIG. 4 has numerals in the "400" category, etc. In addition, the term "cable" may be used interchangeably with the term "bundle" so that an optical fiber cable (or fiber-optic cable) and optical fiber bundle may both be the same entity, each containing a number of mutually-isolated optical fiber strands, and where each strand carries optical signals intended for only one end user customer or subscriber.

In overview, preferred embodiments include a lockable storage box or container having a pre-determined footprint. The box is positioned in a pre-arranged location designed for that footprint in a multi-floored building such as, for example, in a basement or lobby area of a medium-rise or high-rise apartment building having a total number of floors of up to thirty-six or more. That location also can be inside a lockable utility closet in any level of the building or at some other suitable location in the building designed for this purpose. For additional security, the box can be lockable and made tamper proof through conventional means, regardless of its installation inside a lockable utility closet. The storage box can be made from steel or other similarly strong material.

The storage container includes an axel structure about which a number of reels or spools of optical fiber bundles can each independently rotate without interfering with the others, when their respective bundles are pulled from the container by installation technicians. Each bundle has a rough diameter of approximately 3.7 millimeters and comprises twelve separate strands of mutually-isolated optical fiber, each strand being assigned to carrying optical signals to and from a different end-user customer or subscriber. Because of the relatively small diameter of a fiber optic bundle, large and continuous lengths of these bundles can be wrapped around each spool, where those un-interrupted lengths can reach to thirty-six stories or more, if needed.

Different spools can support different off-the-shelf lengths of optical fiber strands, the shorter lengths being used for the lower floors and the longer lengths being used for the higher floors, assuming the storage box is at or near ground level. For example, in a thirty-six floor apartment building, possibly four to six different standard lengths of optical fiber strands, with both ends connectorized, can be spooled and rotatably mounted on thirty-six separate spools in a storage box in an exemplary embodiment for deployment to all floors of that building. (If need be, only one length sufficient for the maximum number of floors to be encountered could be used, where more slack than otherwise would then have to be stored in the slack-strand storage box.) After deployment, the other ends of the strands, which are in the box, are connected through appropriate ports in the storage box to an adjacently located indoor fiber distribution hub (IFDH) which, by way of outdoor optical cable is connected to a remotely-located telecommunications company or cable service provider. Therefore, exemplary embodiments include apparatus and methodology for automatically storing excess length of an optical bundle in a container during and after deployment of the optical bundle, where the container can be positioned on a prescribed or pre-determined floor in a multi-floor building such as an apartment building; the destination of the deployed optical bundle is generally a different floor from the prescribed floor.

FIG. 1 is an exemplary schematic diagram depicting relationship 100 between a telecommunications company (telco) and a multi-floored building wherein exemplary embodiments are particularly useful. Telco 101 is operatively or communicatively coupled to building 102 by way of optical cable 103. Building 102 may be an apartment building having a lobby, six residential floors located above the lobby and labeled "First Floor" through "Sixth Floor", inclusively, each floor separated from its adjacent lower floor by distance "d" as shown, with multiple residences per floor and a basement below ground level 119. The floor numbers, the lobby and the basement are each labeled accordingly in the Fig. and the residences are not shown.

Optical cable 105 represents the total cable output from IFDH 104. In other words, if there are, for example, six reels (not shown in this Fig.) inside storage block 118, each reel's bundle of strands destined for a different floor, optical cable 105 represents all optical strands, collectively, which can be deployed from those six reels. A first reel would contain optical strands associated with the First Floor, a second reel would contain optical strands associated with the Second Floor, etc. If there are twelve strands per reel, with six reels there are seventy-two strands total in optical cable 105.

Bundle 106 represents twelve strands serving the First Floor and is shown to be connected to collector 112 located in the hallway on the First Floor. A collector is akin to a terminal block where, in this instance, twelve optical connections can be made from connectors (not shown) on the ends of the twelve strands. Bundle 107 represents another twelve strands serving the Second Floor and is shown to be connected to collector 113 located in the hallway on the Second Floor. Bundle 108 represents yet another twelve strands serving the Third Floor and is shown to be connected to collector 114 located in the hallway on the Third Floor. Bundle 109 represents an additional twelve strands serving the Fourth Floor and is shown to be connected to collector 115 located in the hallway on the Fourth Floor. Bundle 110 represents yet an additional twelve strands serving the Fifth Floor and is shown to be connected to collector 116 located in the hallway on the Fifth Floor. Finally, bundle 111 represents yet another additional twelve strands serving the Sixth Floor and is shown to be connected to collector 117 located in the hallway on the Sixth Floor.

If collectors are not wanted in the hallways of this building they can be eliminated entirely. In that case, the connectorized ends of the bundles are merely stored in ducts or behind moldings or raceways on each floor, ready to be connected directly to additional optical fibers (not shown) to extend the signal path from those connections along the hallways of the apartment building into each individual apartment or residence. (Reference is again made to the incorporated by reference patent application above, which details this aspect of the process.) Cable 105 is hidden from public view in the lobby and bundles 106-111 are hidden from public view on their respective floors by positioning each of them, respectively, within ductwork or behind a raceway.

Optical cable 103 is a multi-path, bi-directional, optical-communication conduit connecting telco 101 to indoor fiber distribution hub (IFDH) 104 located, in this example, in the lobby of building 102. In a particular cable, data and video can be transmitted from telco 101 to IFDH 104 by way of transmitted optical signals having wavelengths of 1490 nanometers (nm) and 1550 nm, respectively, and channel command overhead information can be returned in the opposite direction from IFDH 104 to telco 101 by way of transmitted optical signals having a wavelength of 1310 nm.

Lockable and tamper-proof storage container 118 is shown located in the lobby of the building. Immediately adjacent container 118 is IFDH 104, which can be co-located with container 118 in a lockable utility closet. (An alternate location is shown for container 118a and IFDH 104a, respectively, in the basement of building 102.) Container 118 (and IFDH 104) can be made from steel or hard plastic or some other similarly hard and intrusion-proof material.

Figure 2:
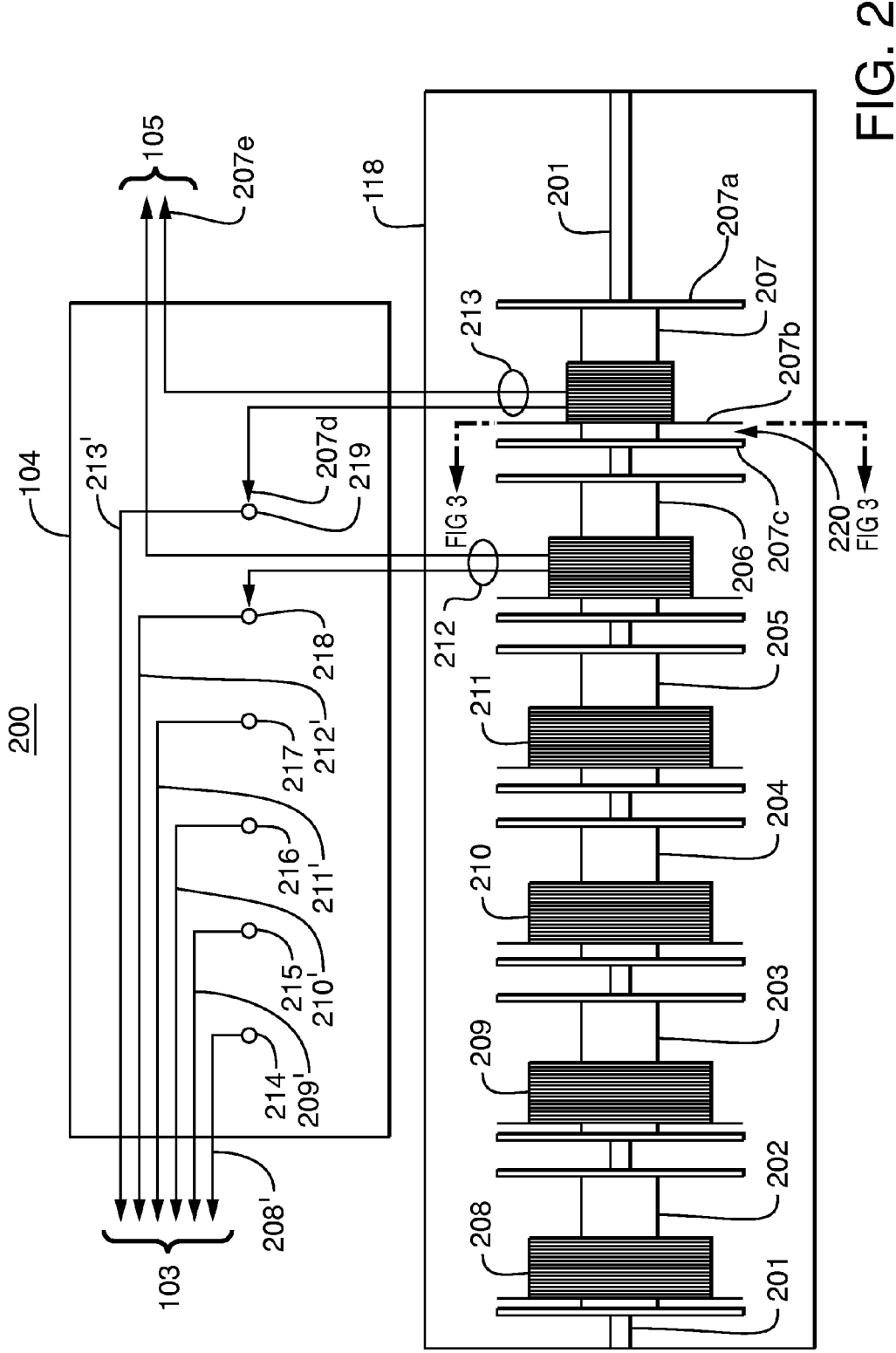
FIG. 2 is an exemplary schematic diagram of an exemplary embodiment.

FIG. 2 is an exemplary schematic diagram of exemplary embodiment 200. Storage container 118 is shown at the bottom of the Fig. IFDH 104 is shown at the top of the Fig. Storage container 118 includes an axis or axel 201 fixedly mounted to, or supported by, sides of box 118. In this example, there are shown six separate reels or spindles 202-207, each of which supports a different bundle length 208-213, respectively, of bundled optical fibers. Each bundle can have an approximate 3.7 mm diameter. Bundle lengths 208-211 are depicted as not yet deployed, and bundle lengths 212 and 213 are depicted as having been deployed. The optical connectors (not shown) attached to both ends of each optical fiber strand (not shown) in the not yet deployed bundles are secured at their respective spindle within box 118. Those optical connectors are inserted into their respective spindle-storage spaces defined by their respective flanges fashioned at one end of each reel. For example, spindle-space 220 is defined by disc or flange 207b and end-face 207c, identified for reel 207. Similar spaces are shown for the other reels in FIG. 2 but are not specifically identified by reference numbers in the interests of clarity of presentation. The flanges are discussed further in connection with discussion of FIG. 3 below. Each reel 202-207 can rotate, independently of all other reels, about axel 201.

IFDH 104 is a self-contained, lockable housing which is physically secure and located next to, if not actually abutting, storage box 118 and which essentially contains multiple sets of terminals from which optical connections can be made to outdoor optical cable 103. Bundle terminals 214-219 are each intended to represent twelve separate optical fiber strand terminals or connector jacks, and are shown in this compressed manner for ease of visual presentation. Cable 103, in this instance, is comprised of seventy-two optical fiber strands, twelve strands associated with each of terminals 214-219 and identified as bundles 208', 209', 210', 211', 212' and 213', respectively, to be associated with bundles 208, 209, 210, 211, 212 and 213, respectively, in storage box 118.

Bundle lengths 212 and 213 associated with reels 206 and 207, respectively, are shown as being deployed. For example, at least one end of bundle 213 to which optical connectors 207e (representing twelve individual optical connectors, each connected to one of twelve optical strands) are attached, was contained within a pull sock (not shown). That one end, or first end, is pulled out from box 118 by an installer through an appropriate port (not shown) formed through box 118 into and out from appropriate ports (not shown) formed through the structure of IFDH 104. That first end forms part of cable 105, as shown. (That first end of bundle 213 and similar first ends of other bundles in box 118 need not pass through IFDH 104. Alternatively, they can be deployed to their respective floors without passing through IFDH 104)

The other end of bundle 213 to which twelve connector plugs 207d are attached, respectively, to twelve individual strands, is removed from box 118 after deployment of the first end of bundle 213 to its intended floor in the apartment building. The other end of bundle 213 is also directed through appropriate ports (not shown) formed through box 118 and IFDH 104 where it is connected to jack 219. Jack 219 represents twelve individual optical connector jacks connected to twelve individual optical fiber strands 213' forming a portion of cable 103, and configured to receive connector plugs 207d.

Figure 3:
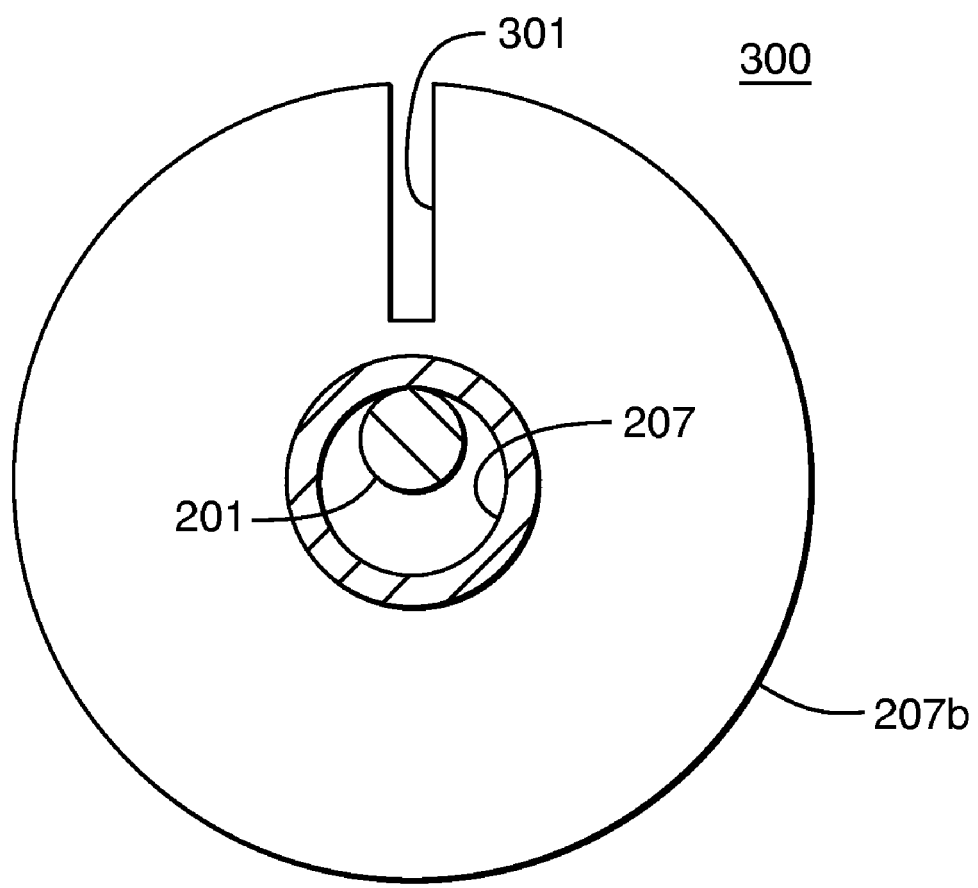
FIG. 3 is an exemplary schematic diagram of a portion of a flange used on a reel or spool of the embodiment of FIG. 2.

FIG. 3 is an exemplary schematic diagram of a portion of a flange 300 used on a reel or spool of the embodiment of FIG. 2. It is a cross-sectional view of flange 300, taken at the slice shown in FIG. 1. Spindle or reel 207, which is made from steel or some other similarly strong material, is supported by rod or axel 201 with substantial rotational clearance as shown; outside diameter of axel 201 is substantially smaller than inside diameter of spindle 207 permitting ease of rotation of the spindle about the axel. Disc 207b, also made from steel or some other similarly strong material as are all of the spindles, is fixedly mounted to spindle 207 or can be formed with spindle 207 as a contiguous component part.

A slot 301 is configured in disc 207b as shown to permit both ends of an optical bundle (twelve connectorized, optical strands on each end for a total of twenty-four connectorized strands and not shown in this Fig.) to be inserted through slot 301 into spindle-space 220 between flange 207b and reel end-face 207c. Flange 207b and reel end-face 207c define spindle-storage space 220 for storing both ends of optical bundle 213 before it was deployed. Before deployment, each end of optical bundle 213 was encased in a pulling sock (not shown) which is a sleeve that fits over all twelve strands on each end, including their connectors, to protect them and keep them together. However, when optical bundle 213 is going to be used, the human operator or technician removes only one end of the bundle from spindle-storage space 220, thereby leaving the other end in its pulling sock in space 220. Thus, when a technician grasps the pulling sock and pulls on the to-be-removed end of bundle 213, the bundle shall easily unravel or unwind from spool 207 as it rotates. That other end of bundle 213 remains safely within the spindle-storage space and rotates with rotation of reel 207. The portion of bundle 213 that has been unwound can be snaked through a riser duct (not shown), which protects the bundle and hides it from view, until it reaches its intended destination floor.

After the intended destination floor is reached, the other end of bundle 213, which is still held within the spindle-storage space 220, can be removed by the technician, not by further rotation of the spindle, but by unwinding no more than a few feet of bundle by hand. That other end of bundle 213 is then passed through its ports (not shown) out from storage box 118 and into IFDH 104, and is then connected to its appropriate set of twelve terminals 219 in IFDH 104. IFDH 104 may be located contiguously with, or adjacent to, storage box 118. The portion of bundle 213 that remains wound on the reel is slack, or the equivalent of slack, which has been automatically and safely stored in storage box 118, un-noticeable to the building's occupants. Assuming that optical signals are available from telco 101 over optical cable 103, this installation technique allows a plug and play result because as soon as both ends of the strands of optical bundle 213 are plugged in, signal flow there-through can take place.

Figure 4:
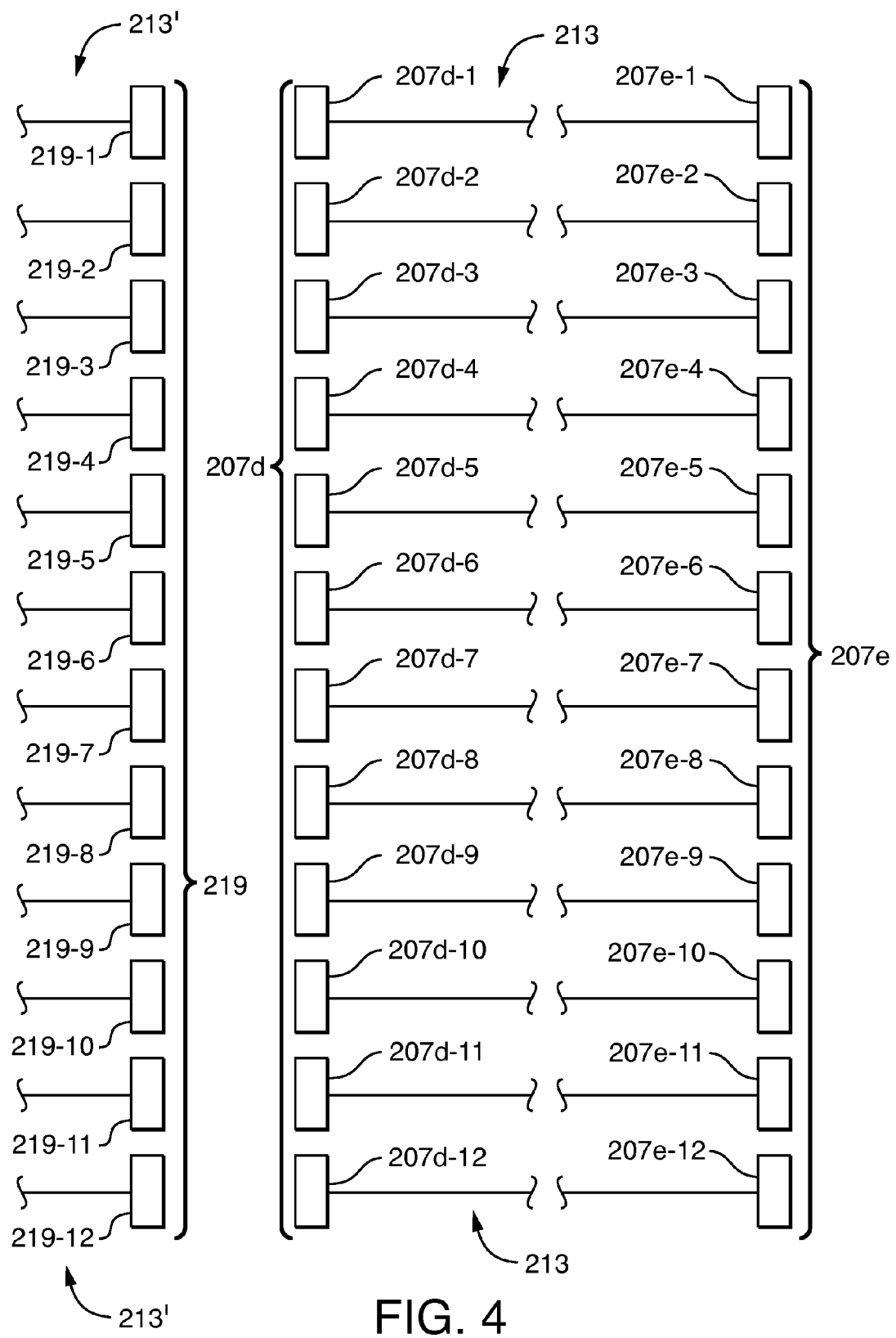
FIG. 4 is an exemplary schematic diagram depicting one bundle of twelve connectorized optical fiber strands used in exemplary embodiments.

FIG. 4 is an exemplary schematic diagram depicting one bundle of twelve connectorized optical fiber strands used in exemplary embodiments. Bundle 213 is shown as twelve mutually isolated optical fibers terminating in a first group of twelve optical connectors 207e-1 inclusively through 207e-12, respectively, on one end thereof and in a second group of twelve optical connectors 207d-1 inclusively through 207d-12, respectively, on the other end thereof. Connector 207e of FIG. 2 is comprised of the first group of optical connectors (e.g., male plugs) 207e-1 through 207e-12. Connector 207d of FIG. 2 is comprised of the second group of optical connectors (e.g., male plugs) 207d-1 through 207d-12. Optical strands 213' shown in FIG. 2 are comprised of twelve strands 213' shown in FIG. 4 and terminating in individual optical connectors (e.g., female jacks) 219-1 through 219-12, respectively. Connector plugs 207d-1 through 207d-12 mate, and make operative optical connections, with connector jacks 219-1 through 219-12 respectively. The male and female aspect of the connectors can be reversed on either or both ends and any claimed embodiment is not constrained to connector orientation described above. Connectors 214-218 of FIG. 2 can each be configured with twelve connectors similarly to that of connector 219.

All connectors can be constructed from MT (mechanical transfer) technology, where separate optical glass fibers, or plastic fibers, physically touch each other inside the connector housings when a connector plug is inserted into its mated connector jack, for the purpose of allowing transfer of optical signal from one fiber to the other. The MT connectors most useful for the embodiments presented herein are available in 12, 72 and 96 fiber strand configurations. These MT connectors would preferably restrict signal loss at the interface of the two abutting fibers to be no greater than a 0.3 db (decibel) loss, with 0.25 db loss being typical. The claimed embodiments are not limited to connectors with these specifications which are provided to disclose the best mode now known for practice of the claimed subject matter. Other connector styles and designs, presently known or not yet developed, may be used with embodiments of the claimed subject matter, and the claims are not limited in any respect to particular connectors.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. There are other variations and modifications that can be made. Therefore, the specification and drawings are to be regarded in an illustrative rather than restrictive sense.

What is claimed is:

1. Apparatus comprising:
a container for automatically storing excess length of each of a plurality of optical bundles in said container during and after deployment of one or more of said optical bundles from said container, said each optical bundle having a plurality of mutually-isolated and optically-transmissive strands, each strand having two ends with a respective optical connector affixed to each end, said container including an axel within said container supported by opposite sides of said container, said axel supporting a plurality of reels each rotatably-mounted on, and independently-rotatable about, said axel, each said optical bundle being wound-around a different one of said reels and being encased at one end thereof in a pulling sock to enable a technician to grasp said pulling sock and pull said optical bundle including all said strands at said one end out of said container to achieve said deployment, thereby automatically storing any remaining portion of said optical bundle on said one of said reels within said container.

2. The apparatus of claim 1 wherein said container is tamper proof and is positioned on a prescribed floor at a prescribed location in a multi-floor building, destination of said deployed optical bundle being a different floor from said prescribed floor.

3. The apparatus of claim 2 wherein said prescribed floor is a lobby of said building or a basement beneath said lobby.

4. The apparatus of claim 3 wherein said building is a residential apartment building.

5. The apparatus of claim 2 wherein all connectors affixed to said strands at the other end of said optical bundle remain enclosed within said container and rotate around said axel during a time period when said technician grasps said pulling sock and pulls said one end of said optical bundle to a collector box located on said different floor.

6. The apparatus of claim 5 wherein, after said one end of said optical bundle is pulled to said different floor, all said enclosed connectors at the other end are unwound from said reel, removed from said container and connected to an indoor fiber distribution hub (IFDH) located in a cabinet adjacent said container, said IFDH being operatively connected to a fiber distribution terminal (FDT) at a telco from which optical signals are received by said enclosed connectors for continued transmission over said strands.

7. The apparatus of claim 1, said reel further comprising a flange forming one end of said reel, said flange formed from two parallel and closely spaced discs, the outer one of the two disks being solid and the inner one of the two disks having a radially-directed slot formed therein to permit insertion of said other end of said bundle including its connectors into said flange thereby holding said other end of said bundle including its connectors away from said unraveling bundle when said technician pulls said pulling sock.

8. The apparatus of claim 1 wherein said plurality of reels comprises:

six, twelve, twenty-four or thirty-six reels, each reel containing twelve said connectorized strands.

9. The apparatus of claim 8 wherein each one of said plurality of reels is wrapped-around by a different bundle having a different length.

10. The apparatus of claim 9 wherein said each different bundle is coded to reflect its length or each of said strands contained in said each different bundle is tagged to identify its length.

11. A method, comprising:

automatically storing excess length of an optical bundle in a container during and after deployment of said optical bundle from said container, opposite sides of said container supporting an axel within said container, said axel having a reel rotatably mounted on said axel, said optical bundle wound around said reel and encased at said one end in a pulling sock, said other end being rotatable with rotation of said reel, to enable a technician to grasp said pulling sock and pull said one end including all optical strands at said one end out of said container for said deployment, thereby unraveling said wound-around optical bundle by a length commensurate with said deployment while automatically leaving any remaining portion of said optical bundle wound-around said reel.

* * * * *